(12) United States Patent
Berkman

(10) Patent No.: US 7,098,773 B2
(45) Date of Patent: Aug. 29, 2006

(54) POWER LINE COMMUNICATION SYSTEM AND METHOD OF OPERATING THE SAME

(75) Inventor: William H. Berkman, New York, NY (US)

(73) Assignee: Current Technologies, LLC, Germantown, MD (US)

( * ) Notice: Subject to any disclaimer, the term of this patent is extended or adjusted under 35 U.S.C. 154(b) by 110 days.

(21) Appl. No.: 10/884,685

(22) Filed: Jul. 2, 2004

(65) Prior Publication Data

US 2005/0001694 A1    Jan. 6, 2005

Related U.S. Application Data

(60) Provisional application No. 60/484,856, filed on Jul. 3, 2003.

(51) Int. Cl.
     *H04M 11/04* (2006.01)

(52) U.S. Cl. .......................... 340/310.01; 340/310.07; 340/310.08; 370/485

(58) Field of Classification Search ........... 340/310.01, 340/310.02, 310.03, 310.05, 310.06, 310.07, 340/310.08; 370/401, 420, 485; 375/258, 375/260; 333/101, 131
See application file for complete search history.

(56) References Cited

U.S. PATENT DOCUMENTS

| | | |
|---|---|---|
| 3,702,460 A | 11/1972 | Blose |
| 3,810,096 A | 5/1974 | Kabat et al. |
| 3,846,638 A | 11/1974 | Wetherell |
| 4,012,733 A | 3/1977 | Whyte |
| 4,016,429 A | 4/1977 | Vercellotti et al. |
| 4,475,209 A | 10/1984 | Udren |
| 4,569,045 A | 2/1986 | Schieble et al. |
| 4,638,298 A | 1/1987 | Spiro |
| 4,912,553 A | 3/1990 | Pal et al. |
| 5,559,377 A | 9/1996 | Abraham |
| 5,684,450 A | 11/1997 | Brown |
| 5,929,750 A | 7/1999 | Brown |

(Continued)

FOREIGN PATENT DOCUMENTS

DE     101 47 918 A1    4/2003

(Continued)

OTHER PUBLICATIONS

"IEEE Guide for Power-Line Carrier Applications, ANSI/IEEE Std 643-1980", *The Institute of Electrical and Electronics Engineers, Inc.*, (1980), 1-80.

(Continued)

*Primary Examiner*—Van T. Trieu
(74) *Attorney, Agent, or Firm*—Mel Barnes; Manelli Denison & Selter PLLC

(57) ABSTRACT

The present invention provides a power line communications system that may employ power lines and non-power communications mediums. In one embodiment, the system is comprised of a plurality of interface devices with each being in communication with one or more user devices via one or more low voltage power lines. Each interface device also may be in communication with an upstream communications device via a non-power line communications medium. The upstream communications device may communicate with a backhaul point via a backhaul link to provide access to a network such as the Internet. In one embodiment, each interface device provides an interface between one or more low voltage power lines and the non-power line communications medium, which may be a coaxial cable. The upstream communications device may provide routing for data communicated with the interface devices.

31 Claims, 9 Drawing Sheets

U.S. PATENT DOCUMENTS

| | | |
|---|---|---|
| 5,933,071 A | 8/1999 | Brown |
| 5,977,650 A | 11/1999 | Rickard et al. |
| 5,982,276 A | 11/1999 | Stewart |
| 6,037,678 A | 3/2000 | Rickard |
| 6,278,357 B1 | 8/2001 | Croushore et al. |
| 6,282,405 B1 | 8/2001 | Brown |
| 6,317,031 B1 | 11/2001 | Rickard |
| 6,496,104 B1 | 12/2002 | Kline |
| 6,950,567 B1 | 9/2005 | Kline |
| 6,958,680 B1 * | 10/2005 | Kline .................... 340/310.11 |
| 6,965,302 B1 | 11/2005 | Mollenkopf et al. |
| 6,965,303 B1 * | 11/2005 | Mollenkopf ........... 340/310.11 |
| 2001/0054953 A1 | 12/2001 | Kline |
| 2002/0097953 A1 | 7/2002 | Kline |
| 2002/0110310 A1 | 8/2002 | Kline |
| 2002/0110311 A1 | 8/2002 | Kline |
| 2002/0121963 A1 | 9/2002 | Kline |
| 2002/0154000 A1 | 10/2002 | Kline |
| 2003/0103307 A1 | 6/2003 | Dostert |
| 2003/0169155 A1 | 9/2003 | Mollenkopf et al. |
| 2004/0032320 A1 | 2/2004 | Zalitzky et al. |
| 2004/0054425 A1 | 3/2004 | Elmore |
| 2004/0113756 A1 | 6/2004 | Mollenkopf |
| 2004/0113757 A1 | 6/2004 | White, II et al. |
| 2004/0223617 A1 | 11/2004 | Corcoran et al. |
| 2004/0227621 A1 | 11/2004 | Cope et al. |
| 2004/0227622 A1 | 11/2004 | Giannini et al. |
| 2004/0257731 A1 | 12/2004 | Legaud |
| 2005/0017825 A1 | 1/2005 | Hansen |
| 2005/0164666 A1 | 7/2005 | Lang et al. |
| 2005/0168326 A1 * | 8/2005 | White et al. ........... 340/310.01 |
| 2005/0194838 A1 | 9/2005 | Wetmore |
| 2005/0238107 A1 | 10/2005 | Yamashita et al. |
| 2005/0249245 A1 | 11/2005 | Hazani et al. |
| 2005/0258920 A1 | 11/2005 | Elmore |

FOREIGN PATENT DOCUMENTS

| | | |
|---|---|---|
| EP | 0 933 883 A2 A3 | 8/1999 |
| EP | 1 075 091 A1 | 2/2001 |
| EP | 1 217 760 A1 | 6/2002 |
| GB | 2 342 264 A | 4/2000 |
| WO | WO-92/16920 A1 | 10/1992 |

OTHER PUBLICATIONS

"Signalling on Low-Voltage Electrical Installations in the Frequency Band 3kHz to 148.5kHz—Part 4: Filters at the Interface of the Indoor and Outdoor Electricity Network", *CLC SC 105A (Secretariat)*, (May 1992), 1-11.

"Summary of an IEEE Guide for Power-Line Carrier Applications", *IEEE Transactions on Power Apparatus and Systems*, (Nov./Dec. 1980),2334-2337.

Amirshahi, P., et al., "Transmission Channel Model and Capacity of Overhead Multi-conductor Medium-Voltage Power-lines for Broadband Communications", *Pennsylvania State Universtiy*, (Jan. 3, 2005).

Feduschak, N A., "Waiting in the Wings: Is Powerline Technology Ready to Compete with Cable?", www.cabletoday.com/ic2/archives/0301/0301powerline.htm, (Mar. 2001), 1-5.

Hasler, E F., et al., "Communication Systems Using Bundle Conductor Overhead Power Lines", *IEEE Transactions on Power Apparatus and Systems*, (Mar./Apr. 1975),344-349.

Meng, H, et al., "A Transmission Line Model for High-Frequency Power Line Communication Channel", *IEEE*, (2002), 1290-1295.

Naredo, J L., et al., "Design of Power Line Carrier Systems on Multitransposed Delta Transmission Lines", *IEEE Transactions on Power Delivery*, (1991),952-958.

* cited by examiner

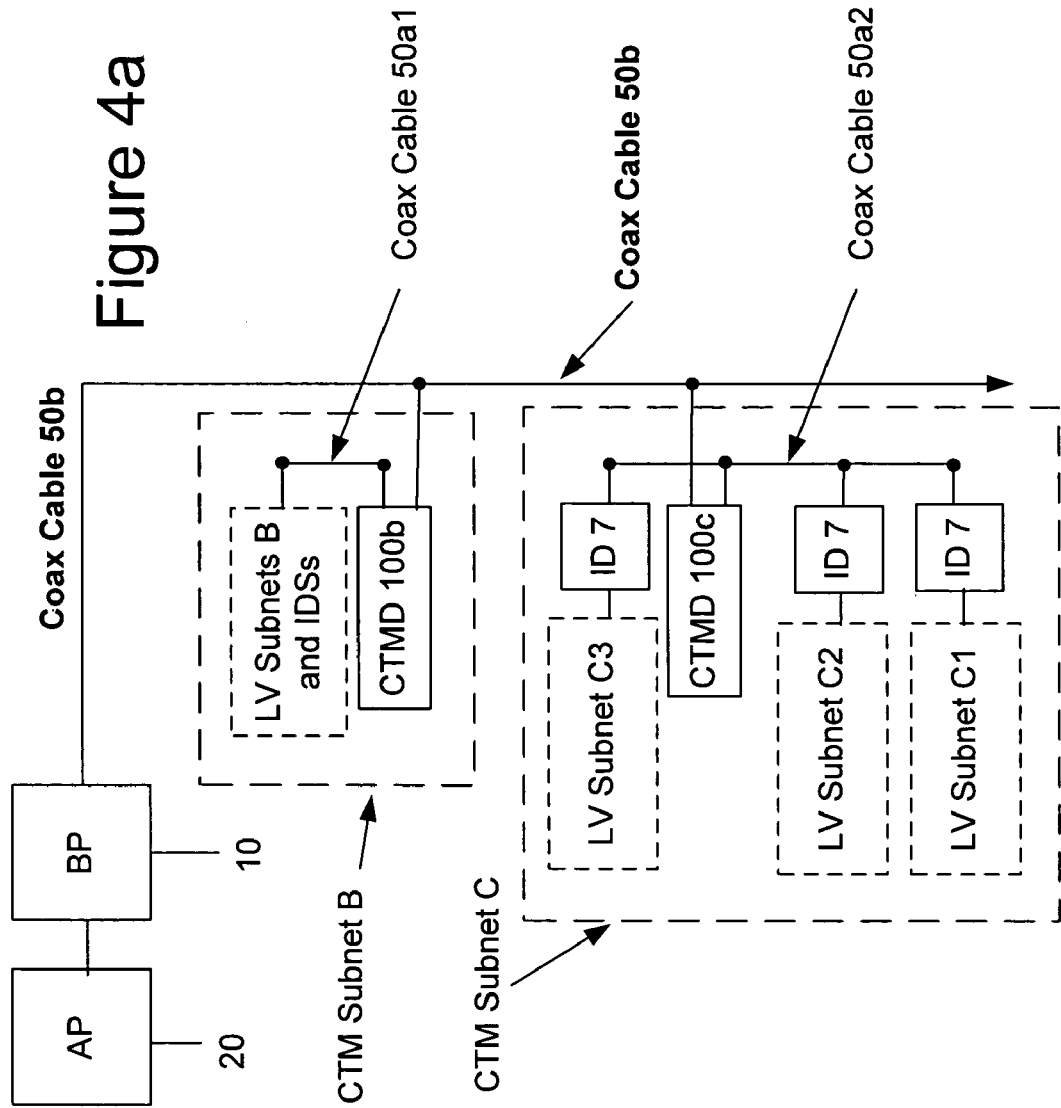

POWER LINE COMMUNICATION SYSTEM AND METHOD OF OPERATING THE SAME

CROSS REFERENCE TO RELATED APPLICATIONS

This application claims priority under 35 U.S.C. § 119(e) to U.S. Provisional Patent Application Ser. No. 60/484,856 filed Jul. 3, 2003, which is incorporated herein by reference in its entirety.

FIELD OF THE INVENTION

The present invention generally relates to data communications over a power distribution system and more particularly, to a system and method for communicating data, which may include video, audio, voice, and/or other data types.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines, that already have been run to many homes and offices, can be used to carry data signals to and from the homes and offices. These data signals are communicated on and off the power lines at various points in the power line communication system, such as, for example, near homes, offices, Internet service providers, and the like.

While the concept may sound simple, there are many challenges to overcome in order to use power lines for data communication. Power lines are not designed to provide high speed data communications and are very susceptible to interference. Additionally, federal regulations limit the amount of radiated energy of a power line communication system, which therefore limits the strength of the data signal that can be injected onto power lines (especially overhead power lines).

Power distribution systems include numerous sections, which transmit power at different voltages. The transition from one section to another typically is accomplished with a transformer. The sections of the power distribution system that are connected to the customers premises typically are low voltage (LV) sections having a voltage between 100 volts(V) and 240V, depending on the system. In the United States, the LV section typically is about 120V. The sections of the power distribution system that provide the power to the LV sections are referred to as the medium voltage (MV) sections. The voltage of the MV section is in the range of 1,000V to 100,000V. The transition from the MV section to the LV section of the power distribution system typically is accomplished with a distribution transformer, which converts the higher voltage of the MV section to the lower voltage of the LV section.

Power system transformers are another obstacle to using power distribution lines for data communication. Transformers act as a low-pass filter, passing the low frequency signals (e.g., the 50 or 60 Hz) power signals and impeding the high frequency signals (e.g., frequencies typically used for data communication). As such, some power line communications systems face the challenge of communicating the data signals around, or through, the distribution transformers.

In contrast, conventional communication media, such as coaxial cables, Ethernet cables, fiber optic cables, and twisted pair, typically provide significantly better characteristics for communicating data than power lines. However, the cost of installing the conventional communications medium (i.e., non-power line communications medium) may be very significant and in some instances, prohibitive from a business perspective. In particular, a major cost of installing such media is the segment that extends from the common communication link, which typically is along the street, to each customer premises. This segment typically requires a dedicated cable for each customer premises.

In a power line distribution system, up to ten (and sometimes more) customer premises typically will receive power from one distribution transformer via their respective LV power lines. These LV power lines constitute infrastructure that is already in place. Thus, it would be advantageous for a communications system to make use of this existing infrastructure in order to save time and reduce costs of the installation.

Typically, the LV power lines extend from each customer premises to a distribution transformer and are all electrically connected to each other remote from the premises such as near the transformer. Thus, the LV power lines that electrically connect one customer premises to a distribution transformer are also electrically connected to the LV power lines connected to all the other customer premises receiving power from that distribution transformer. Consequently, a communications system employing the LV power lines must be able to tolerate the interference produced by many users. In addition, the communications system should provide bus arbitration and router functions for numerous customers who share a LV subnet (i.e., the LV power lines that are all electrically connected to the LV side of the transformer).

These and other advantages are provided by various embodiments of the present invention.

SUMMARY OF THE INVENTION

The present invention provides a power line communications system that may employ power lines and non-power communications mediums. In one embodiment, the system is comprised of a plurality of interface devices with each being in communication with one or more user devices via one or more low voltage power lines. Each interface device also may be in communication with an upstream communications device via a non-power line communications medium. The upstream communications device may communicate with a backhaul point via a backhaul link to provide access to a network such as the Internet. In one embodiment, each interface device provides an interface between one or more low voltage power lines and the non-power line communications medium, which may be a coaxial cable. The upstream communications device may provide routing for data communicated with the interface devices.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 4a is a schematic of a power line communications system in accordance with another example embodiment of the present invention;

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description.

System Architecture and General Design Concepts

Figure 1:
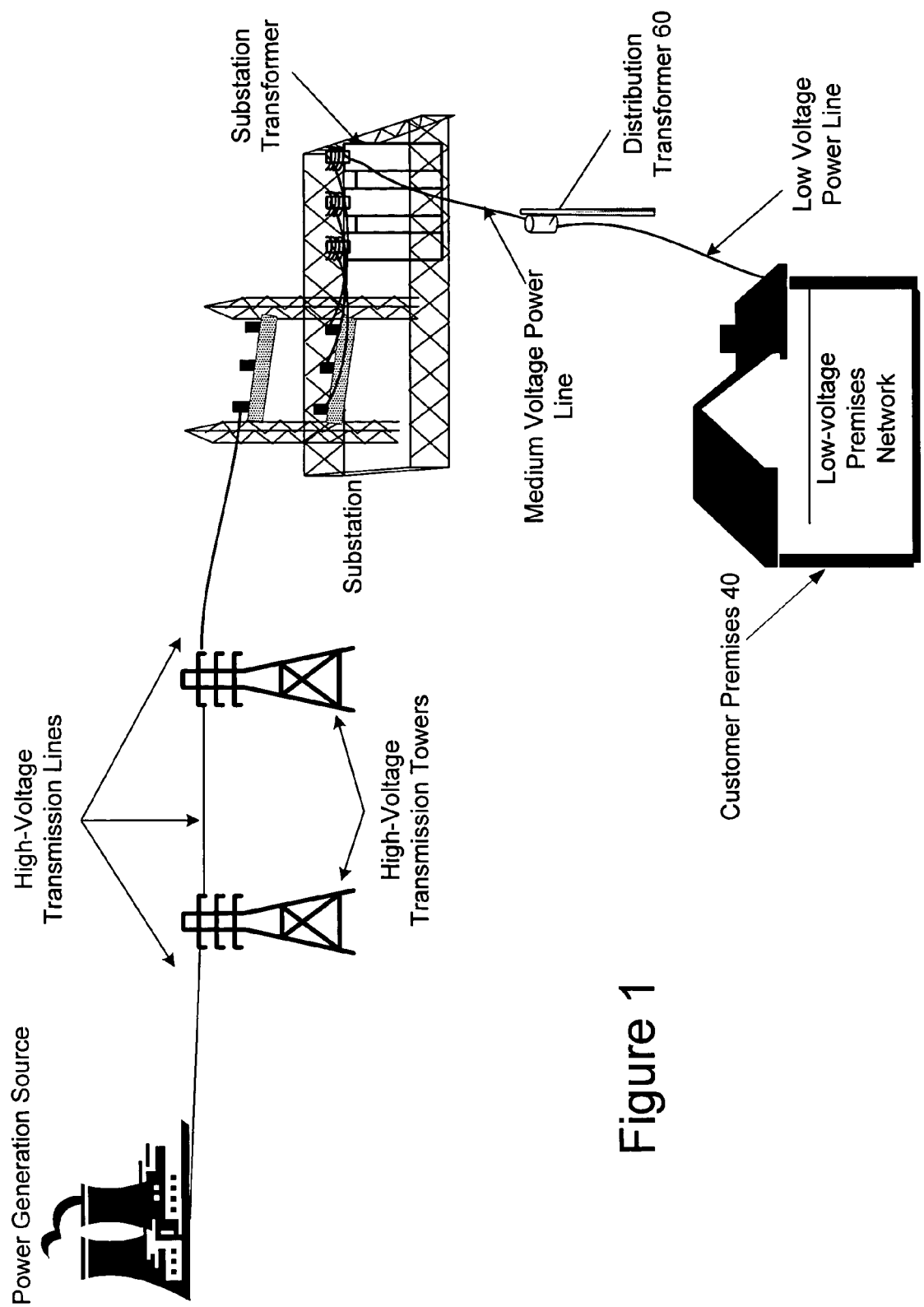
FIG. 1 is a diagram of an exemplary power distribution system with which the present invention may be employed.

As shown in FIG. 1, power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. As discussed, MV typically ranges from about 1000 V to about 100 kV and LV typically ranges from about 100 V to about 240 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase currents to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

Overview of Example Embodiments

The present invention employs the LV power lines, including the internal and external LV power lines associated with customer premises, and a conventional telecommunications medium (CTM) (i.e., a non-power line communications medium). Some embodiments also may employ the MV power lines. In addition, the invention may be used with overhead or underground power distribution systems.

Specifically, a power line modem, such as a HomePlug™ compliant modem (e.g., HomePlug 1.0 or HomePlug AV standard), interfaces the user device (such as computer, telephone, fax, etc.) to the internal LV wiring of the customer premises. The power line modem may be a stand alone device or integrated into the user device.

The power line modem couples the data from the user device to the internal LV power lines. The data propagates from the internal to the external LV power lines until reaching an interface device such as power line-coaxial interface device (PLCID) that communicatively couples the external LV power line to a conventional telecommunications medium, such as a coaxial cable or other non-power line communications medium.

Thus, the interface device receives signals from the LV power line, such as Orthogonal Frequency Divisional Multiplexing (OFDM) signals, and communicates them through (or couples them to) the coaxial cable or other CTM. Likewise, the interface device (ID) receives signals from the CTM (e.g., coaxial cable) and transmits them through (or couples them to) the LV power lines. While the ID couples data signals (which may comprises voice data, video data, internet data, or the like), it prevents the power signal of the LV power lines from being conducted to the CTM.

In the upstream direction (away from the user device), the ID is in communication with a communication device that interfaces with the CTM. This upstream device may be a conventional telecommunications medium device (CTMD). The CTMD may interface only with conventional telecommunications medium or may additionally interface with a low and/or medium voltage power line (i.e., it may be a power line communications device). Specifically, the interface devices (IDs) receive data from their respective user devices (e.g., via one or more power line modems) and may transmit or couple (collectively referred herein as "communicate") the data upstream to the CTMD via the CTM. The CTMD receives data from one or more IDs and, after certain processing which may take place, may transmit the data upstream toward the data's destination via a backhaul link, which may be the same, or a different, CTM or another communication link. Thus, the CTMD may aggregate data from numerous IDs. The first upstream device to receive the data from the CTMD may be a backhaul point, a distribution point, an aggregation point, or a point of presence—all of which may aggregate data from other CTMDs and/or other network elements.

Additionally, the CTMD may itself provide an interface between a LV subnet and the CTM. Therefore, for those customer premises connected to the CTMD's LV subnet, the CTMD may communicate data with the user devices of those customer premises directly (as opposed to communicating the data via an ID and CTM).

Thus, a CTMD may act as the gateway between the CTM, its IDs and the user devices (i.e., the devices that are communicatively coupled to the LV power lines and IDs) and a backhaul link. The CTMD may provide communications services for the users, which may include security management, routing of Internet protocol (IP) packets, filtering data, access control, service level monitoring, signal processing and modulation/demodulation of signals.

In some embodiments, the PLCS also includes a backhaul point. The backhaul point is an interface and gateway between the PLCS network and a traditional non-power line telecommunication network. One or more backhaul points are communicatively coupled to an aggregation point (AP) that in many embodiments may be the point of presence to the Internet. The backhaul point may be connected to the AP using any available mechanism, including fiber optic conductors, T-carrier, Synchronous Optical Network (SONET), or wireless techniques well known to those skilled in the art. Thus, the backhaul point may include a first transceiver suited for communicating via the upstream conventional communications medium and a second transceiver suited for communicating via the backhaul link.

The AP may include a conventional Internet Protocol (IP) data packet router and may be directly connected to an Internet backbone thereby providing access to the Internet. Alternatively, the AP may be connected to a core router (not shown), which provides access to the Internet, or other communication network. Depending on the configuration of the network, a plurality of APs may be connected to a single core router which provides Internet access. The core router (or AP as the case may be) may route voice traffic to and from a voice service provider and route Internet traffic to and from an Internet service provider. The routing of packets to the appropriate provider may be determined by any suitable means such as by including information in the data packets to determine whether a packet is voice. If the packet is voice, the packet may be routed to the voice service provider and, if not, the packet may be routed to the Internet service provider. Similarly, the packet may include information (which may be a portion of the address) to determine whether a packet is Internet data. If the packet is Internet data, the packet may be routed to the Internet service provider and, if not, the packet may be routed to the voice service provider.

In some embodiments, there may a distribution point (not shown) between the backhaul point and the AP. The distribution point, which may be a router, may be coupled to a plurality of backhaul points and provides routing functions between its backhaul points and its AP. In one example embodiment, a plurality of backhaul points are connected to each distribution point and each distribution point (of which there is a plurality) is coupled to the AP, which provides access to the Internet.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote operations center to oversee a group of communications devices via the Internet. The PLS may provide an Internet identity to the network devices by assigning the devices (e.g., user devices, CTMDs, IDs (if necessary), repeaters, backhaul points, and AP) an IP address and storing the IP address and other device identifying information (e.g., the device's location, address, serial number, etc.) in its memory. In addition, the PLS may approve or deny user devices authorization requests, command status reports and measurements from the CTMDs, repeaters, IDs (potentially), and backhaul points, and provide application software upgrades to the communication devices (e.g., CTMDs, IDs (potentially), backhaul points, repeaters, and other devices). The PLS, by collecting electric power distribution information and interfacing with utilities' back-end computer systems may provide enhanced distribution services such as automated meter reading, outage detection, restoration detection, load balancing, distribution automation, Volt/Volt-Amp Reactance (Volt/VAr) management, and other similar functions. The PLS also may be connected to one or more APs and/or core routers directly or through the Internet and therefore can communicate with any of the CTMDs, repeaters, IDs, user devices, and backhaul points through the respective AP and/or core router.

The user device connected to the power line modem (PLM) may be any device cable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device, a home network device, a utility meter, or other device. The PLM transmits the data received form the user device through the customer LV power line to an ID and provides data received from the LV power line to the user device. The PLM may also be integrated with the user device, which may be a computer. In addition, the functions of the PLM may be integrated into a smart utility meter such as a gas meter, electric meter, water meter, or other utility meter to thereby provide automated meter reading (AMR).

The CTMD typically transmits the data to the backhaul point, which, in turn, transmits the data to the AP. The AP then transmits the data to the appropriate destination (perhaps via a core router), which may be a network destination (such as an Internet address) in which case the packets are transmitted to, and pass through, numerous routers (herein routers are meant to include both network routers and switches) in order to arrive at the desired destination.

Figure 2:
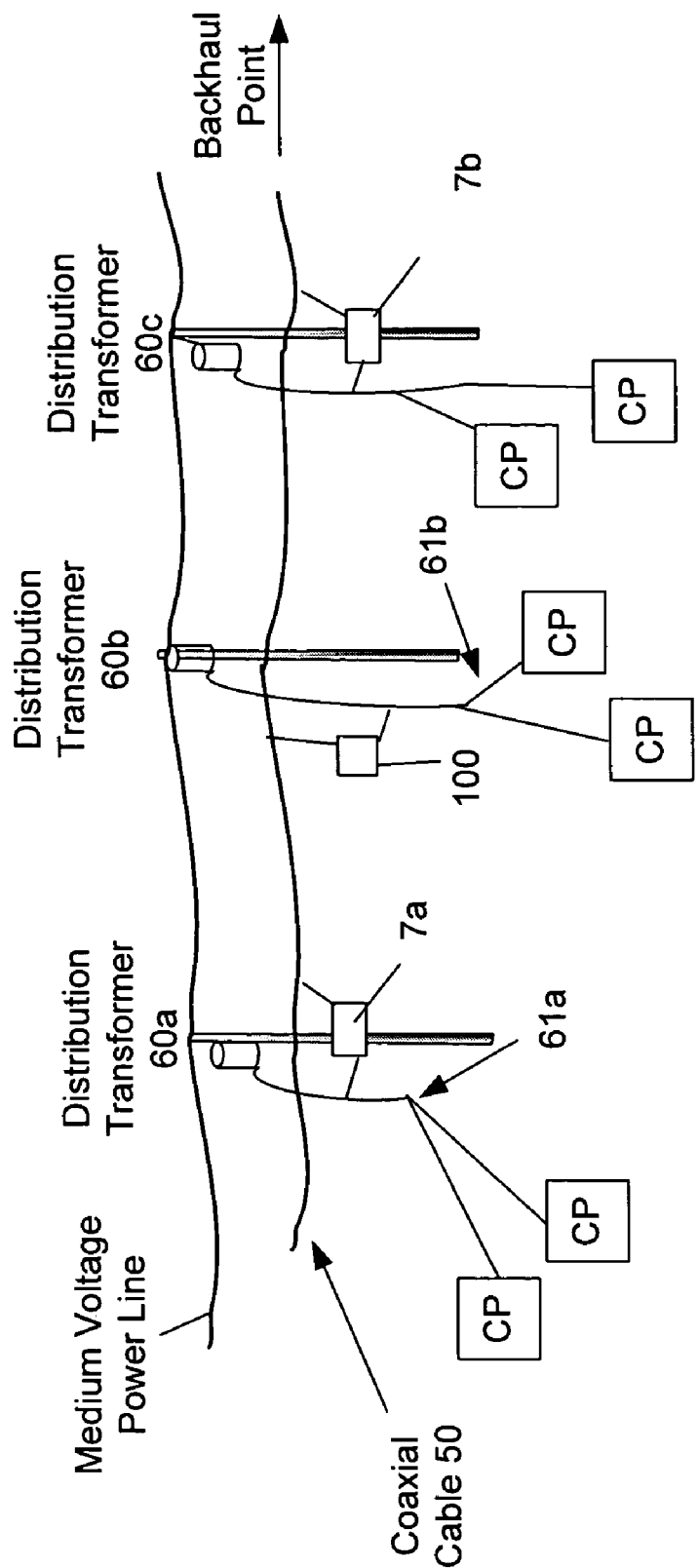
FIG. 2 is a diagram of a power line communications system, in accordance with an example embodiment of the present invention.

In a first embodiment of the present invention, one or more IDs are communicatively coupled to a CTMD via a CTM. As illustrated in FIG. 2, the IDs 7a and 7b, which in this embodiment are Power Line Coaxial Interface Devices (PLCIDs), interface the LV power lines 61 to the coaxial cable 50 (i.e., the CTM). Typically, a single LV power line 61 (e.g., comprised of two energized conductors and one neutral conductor) extends from the distribution transformer 60 and, after traversing some distance, splits into numerous LV power lines with each LV power line extending to a different customer premises CP. In this description, all of the LV power lines extending from a distribution transformer to all of the customer premises are referred to collectively as the LV subnet. Thus, a LV subnet may service a plurality of customer premises.

As is illustrated by FIG. 2, the ID 7 may be coupled to the LV power line near the distribution transformer 60 and, more particularly, communicatively coupled to the LV power line prior to the place at which the LV power line splits into multiple LV power lines. Such an installation allows the ID 7 to be mounted to the utility pole (in overhead power line systems), provides convenient and rapid installation, and may permit a more even power distribution (i.e., propagation) of the data signals through the LV subnet.

In this embodiment, the IDs 7 include a power signal filter (e.g., a high pass filter that may comprise one or more capacitors) to prevent the sixty hertz power signal carried by the LV power line 61 from reaching the coaxial cable 50. In addition, the IDs 7 may include impedance translation circuitry, for example, to provide impedance matching between the CTM (coaxial cable 50) and the LV power line 61. The impedance translation circuitry may be comprised of a balun transformer. Thus, in this embodiment the ID 7 may be a passive device (i.e., not requiring power) comprised of the discussed filter and impedance translation circuitry.

In other embodiments, the ID 7 may also amplify the signal, for example, via an analog amplifier circuit. For example, if each direction of communication (upstream and downstream) employs a different frequency band, the ID may have an amplifier and band pass filter for each direction of communications. Alternately, the ID 7 may regenerate the data signal which may comprise repeating the signal by receiving and processing the data (e.g., demodulating the signal, performing error correction, channel coding, etc.) and then retransmitting the signal (e.g., by modulating the signal, channel coding, etc.). All data may repeated or only select data may be repeated. In still other embodiments, in addition to the repeater functionality, the ID 7 may perform routing functions, Media Access Control (MAC), Internet Protocol (IP) address processing, and/or the other functions described below in relation to the CTMD 100.

As shown in FIG. 2, the IDs 7 are in communication with the CTMD 100 via the coaxial cable 50. In this embodiment, the CTMD 100 also provides communications to the customer premises CP that are coupled to the nearby distribution transformer 60b. Thus, this CTMD 100 includes a first port for communicating with the LV subnet, and a second port for communicating with the coaxial cable 50 to communicate data with the IDs 7. Additionally, in this embodiment, the CTMD 100 communicates with an upstream device (e.g., a backhaul point) via the same coaxial cable 50.

There are numerous methods of providing multiple communication channels via a single CTM that could be used. In this embodiment, the CTMD 100 and the upstream device (not shown) may communicate in a first frequency band (referred to herein as the "backhaul link") and the CTMD 100 and IDs 7 may communicate in a second frequency band. In other embodiments, all the devices may use time division multiplexing or some combination of frequency division and time division multiplexing.

The CTMD 100 alternately may have a third port (and transceiver) that is communicatively coupled to the CTM for communications with the upstream device. Alternately, the second port may be used for all communications of the CTMD 100 on the CTM (e.g., communicating at both frequency bands through the same port/connection).

Figure 3:
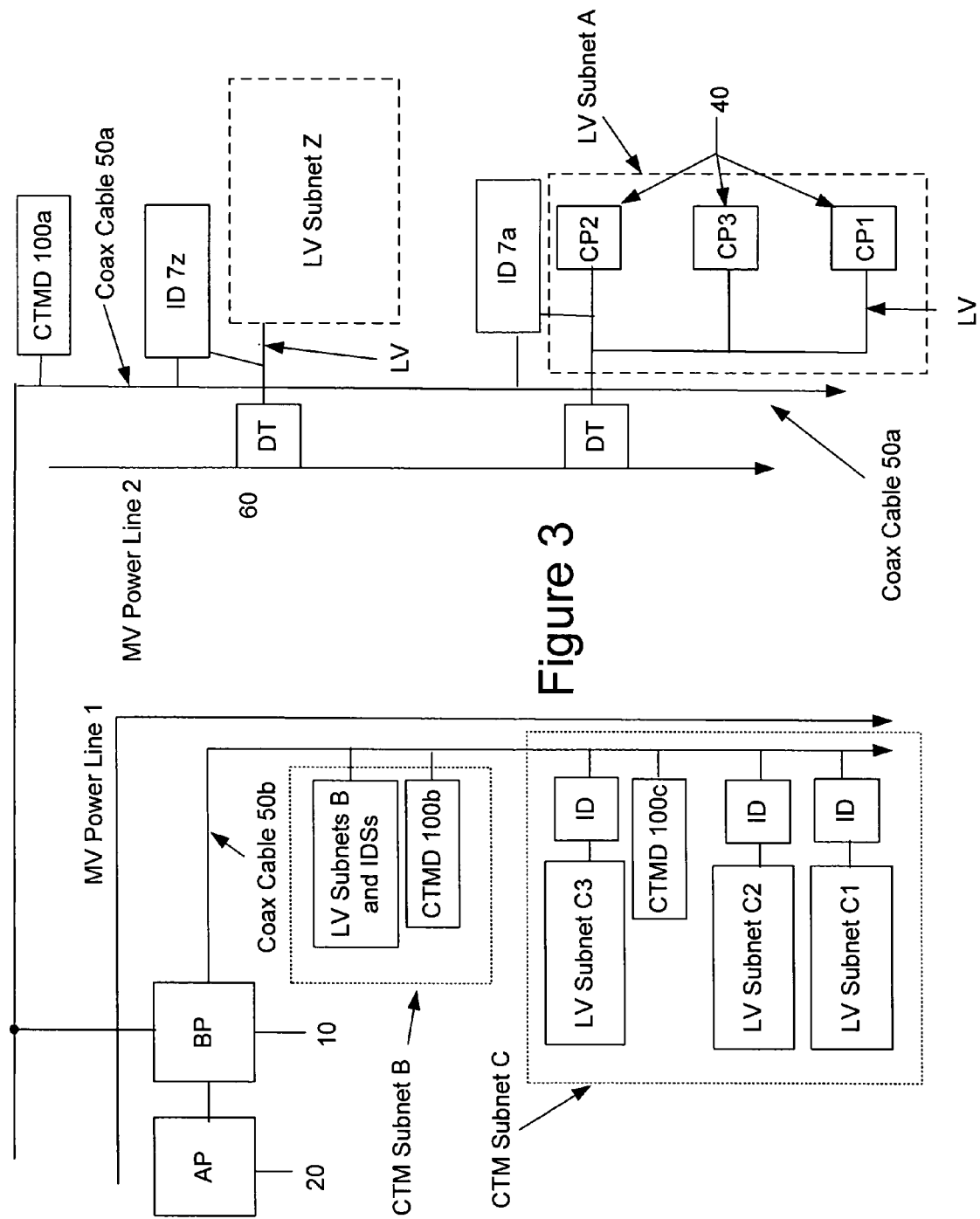
FIG. 3 is a schematic of a power line communications system in accordance with the example embodiment of the present invention of FIG. 2.

Referring to FIG. 3, this example embodiment of the system may comprise one or more CTMs 50 that communicatively couple one or more respective CTMDs 100 to a backhaul point 10. In the example shown in FIG. 3, CTMD 100a is communicatively coupled to the backhaul point 10 via coaxial cable 50a. CTMD 100b and CTMD 100c also are communicatively coupled to the backhaul point 10 via coaxial cable 50b.

CTMD 100a also is communicatively coupled to ID 7a and ID 7b via coaxial cable 50a. In this embodiment ID 7a and ID 7z (and the other IDs of the figure) are Power Line Coaxial Interface Devices. Each ID 7 in the figure interfaces a coaxial cable 50 to a LV subnet. For example, ID 7a interfaces the LV subnet A to coaxial cable 50a to communicatively couple the user devices in customer premises CP1, CP2, and/or CP3 with the CTMD 100a. Likewise, ID 7z interfaces the LV subnet Z to coaxial cable 50a to permit communications between CTMD 100a with the user devices in the customer premises of LV subnet Z.

For ease of discussion, CTMD 100a, ID 7a and its LV subnet A, and ID 7z and its LV subnet Z are referred herein to as "CTM subnet A." Likewise, CTM subnet B and CTM subnet C may have the same components (but perhaps more or less IDs and LV subnets) and are indicated by the dotted rectangles in FIG. 3. Thus, in the embodiment, each CTM subnet is comprised of a CTMD 100, and one or more IDs 7, with each ID 7 providing an interface between its LV subnet and the CTM.

As shown in FIG. 3, the CTMDs 100 of CTM subnet B and CTM subnet C are communicatively coupled to BP 10 via coaxial cable 50b. The BP 10 may be coupled to one or more coaxial cables, with one or more CTMDs 100 coupled to each coaxial cable. Thus, each CTMD aggregates the data from one or more IDs. Similarly, the BP 10 in this embodiment aggregates the data from the CTMDs 100 and the AP 20 aggregates the data from one or more BPs 10.

In this embodiment, data is communicated between each ID 7 and its CTMD 100 in a first frequency band. Additionally, communications between the network elements of the CTM subnet (the IDs 7 and CTMD 100) may be time division multiplexed in the first frequency band. Alternately, the CTMD 100 may transmit, and the IDs 7 receive, in a first portion of the first frequency band and the IDs 7 may transmit, and the CTMD 100 receive, in a second portion of the first frequency band. Such IDs may therefore employ frequency translation circuitry, which is well known in the art. This alternative also may employ time division multiplexing among the IDs 7 and may permit full duplex communications.

In this example embodiment, data is communicated between each CTMD 100 and the backhaul point 10 in a second frequency band. In one embodiment, the backhaul point 10 and CTMDs 100 coupled to the coaxial cable 50 communicate in the second frequency band via time division multiplexing (i.e., only one device coupled to the same coaxial cable is transmitting at a time).

In another embodiment, each CTMD 100 may be allocated a different portion of the second frequency band to transmit and receive data from the upstream device (e.g., the backhaul point 10). In this embodiment, the backhaul point 10 shares the allocated portion of the second frequency band and communication in that band is achieved via time division multiplexing with each CTMD 100 (i.e., the backhaul point transmits to each CTMD 100 when that CTMD 100 is not transmitting and vice versa).

In an alternative embodiment, each CTMD 100 is allocated a different portion of the second frequency band (referred to herein as a CTMD band). However, each CTMD band is further divided into a first and second sub-band. The CTMD transmits data (and the backhaul point receives data)

using carriers in a first frequency band of the CTMD band. Likewise, the backhaul point 10 transmits data (and the CTMD receives data) using carriers in a second frequency band of the CTMD band. Thus, this embodiment employs frequency division multiplexing and may permit full duplex communications between the CTMDs 100 and the backhaul point 10 or other upstream device.

In addition, the IDs 7 of each CTM subnet may use different frequency bands so that the IDs of one CTM subnet do not interfere with those of another CTM subnet. Likewise, such a frequency allocation prevents the IDs 7 of one CTM subnet from communicating with the CTMD 100 of another CTM subnet and the CTMD 100 of a first CTM subnet from communicating with the IDs of another CTM subnet.

Figure 4B:
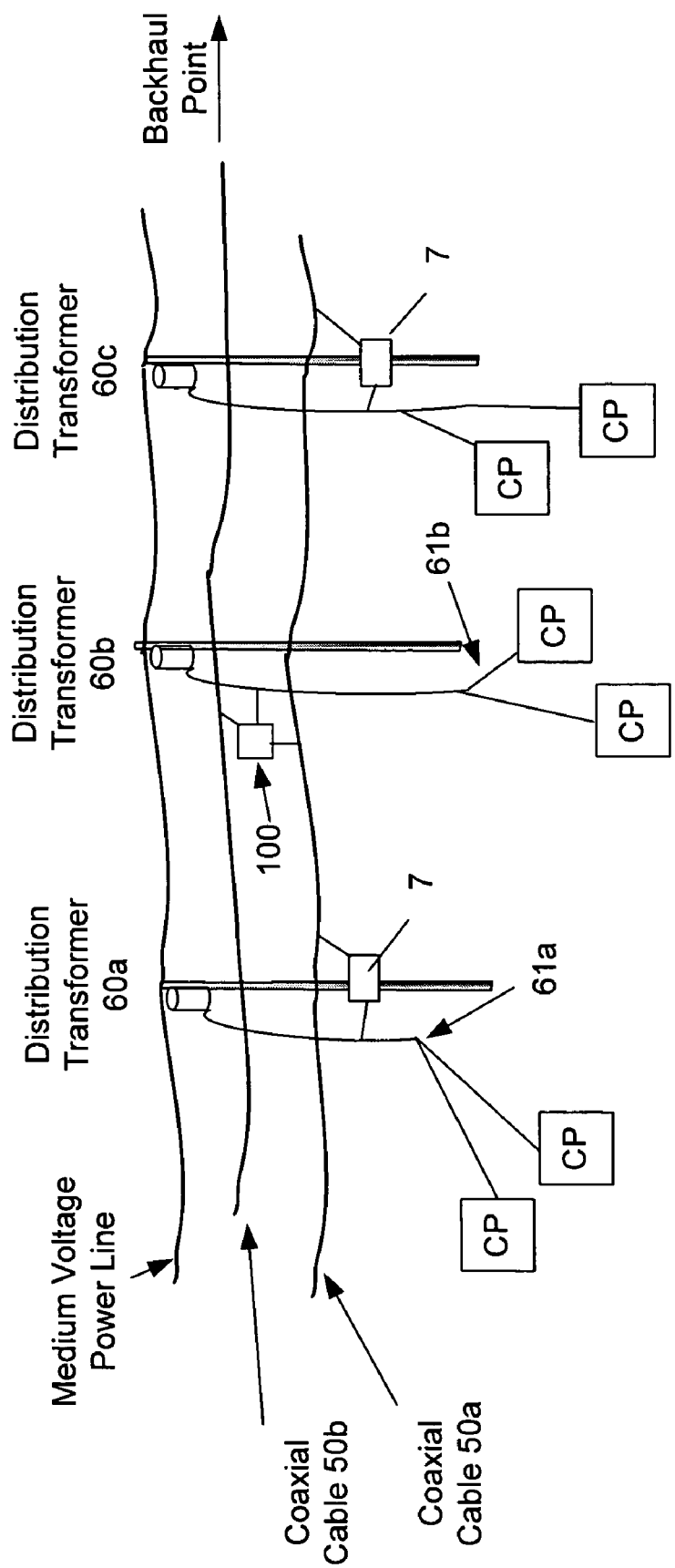
FIG. 4b is a diagram of a portion of the power line communications system of FIG. 4a, in accordance with an example implementation thereof.

Employment of the first embodiment may require installation of a CTM such as coaxial cable. The marginal increase in cost of simultaneously installing a second CTM may be relatively small. Thus, in the second embodiment of the present invention, a second CTM, such as a second coaxial cable, is installed as shown in FIGS. 4a and 4b. (FIG. 4a is a schematic representation of the embodiment that does not depict the MV power line.) In this embodiment, coaxial cable 50a1 provides a communication link between the IDs 7 in CTM subnet B and their CTMD 100b. Likewise, coaxial cable 50a2 provides a communication link between the IDs 7 in CTM subnet C and their CTMD 100c. Coaxial cable 50b, provides a communication link between the CTMDs 100 and the backhaul point 10 or other upstream device (e.g., distribution point, or aggregation point).

As shown in FIGS. 4a, coaxial cable 50b provides a backhaul link and couples a number of CTM subnets to the backhaul point 10 (or other upstream device). However, coaxial cable 50a, referred to herein as a subnet link, communicatively couples together only those network elements of a single CTM subnet. For example, coaxial cable 50a2 communicatively couples the CTMD 100c and the three IDs 7 of CTM Subnet C together. In practice, it is likely that the two CTMs (50a and 50b) will be installed in parallel and the CTM forming the subnet link (coaxial cable 50a) bisected at various points to separate the subnet links.

In this embodiment, upstream data signals will flow from the user devices (e.g., via a power line modem) through the LV power lines, through the ID 7, through the subnet link (e.g., coaxial cable 50a1 or 50a2), through the corresponding CTMD 100, through the backhaul link (e.g., coaxial cable 50b), to the upstream device (e.g., backhaul point 10). Downstream traffic flows from the backhaul point 10, through the backhaul link (50b), through the addressed CTMD 100, through the corresponding subnet link, through the ID(s) 7, through the LV power line(s), to the addressed user device (e.g., via the power line modem).

Separating the subnet links provides a number of benefits. For example, the IDs 7 of different CTM subnets may use the same frequencies because the subnet links are effectively isolated. In other words, the IDs 7 of different CTM subnets are not communicatively coupled via a CTM (as in the first embodiment) and, therefore, the IDs 7 of different CTM subnets cannot interfere with each other when using the same frequency and cannot communicate with the CTMD 100 of a different CTM subnet.

Another benefit is that there is about twice as much bandwidth available for communications. Thus, the subnet link may use the entire bandwidth of the CTM for communications between the IDs 7 and the CTMD 100. Similarly, the backhaul point 10 and the CTMDs 100 may use the entire bandwidth of the backhaul link for communications. Thus, each CTMD 100 isolates and (and couples) communications between its CTM subnets, and its subnet link, from (to) the backhaul link and backhaul point 10.

In a third embodiment of the present invention, a CTM communicatively couples one or more LV subnets to the CTMD via one or more IDs. The CTMD communicates with the upstream device via the existing MV power line, which provides the backhaul link. In some prior art systems, a transformer bypass device is installed at each distribution transformer to pass data between the LV subnet and the MV power line. However, each bypass device may be expensive. Additionally, coupling to the MV power line typically requires personnel trained to work with dangerous medium voltages which may make installation costly. Consequently, a system that couples to the MV power line at fewer locations, also may be less expensive to manufacture and install.

Figure 5:
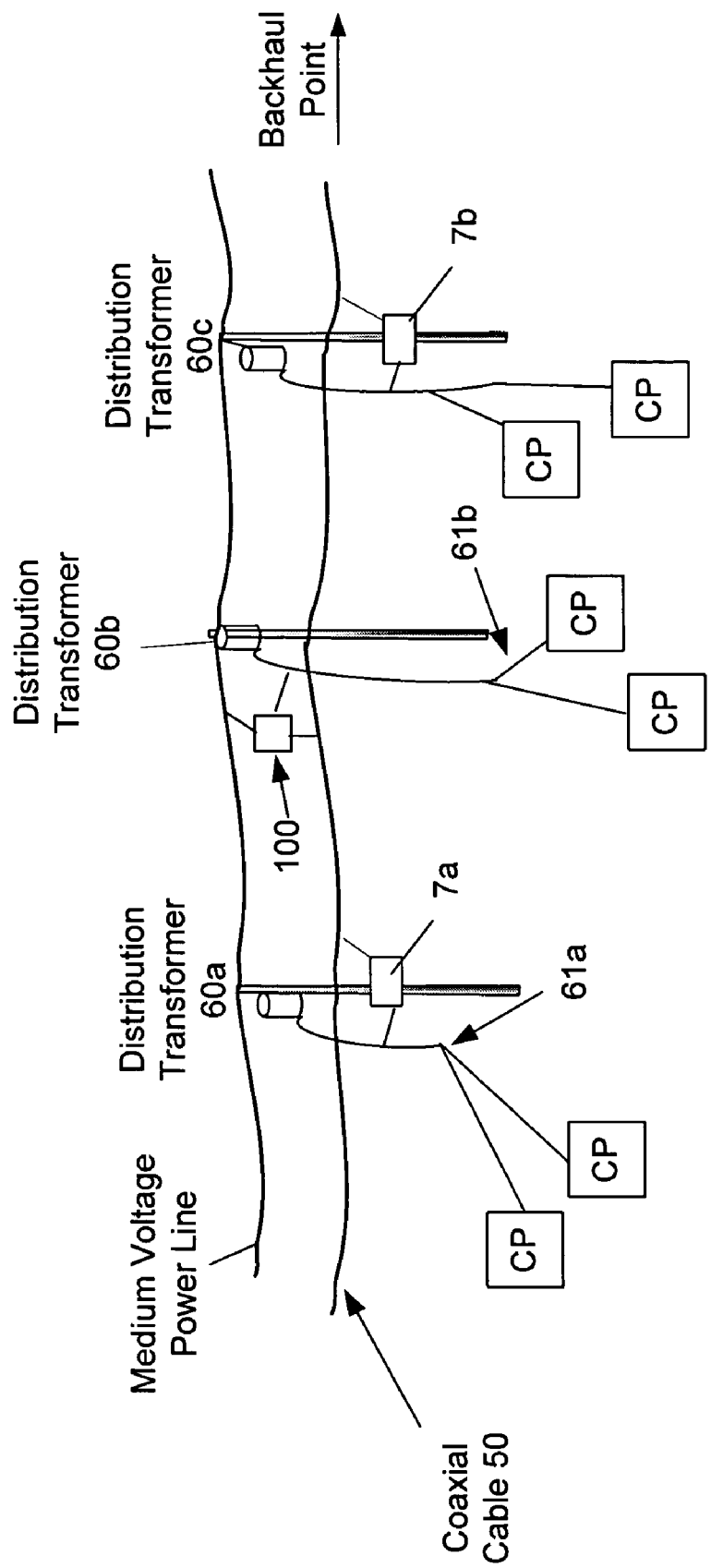
FIG. 5 is a diagram of a power line communications system, in accordance with another example embodiment of the present invention.

As shown in FIG. 5, this embodiment includes two IDs 7a and 7b that communicatively couple each of their respective LV subnets to the coaxial cable 50. Additionally, a CTMD 100 is coupled to the coaxial cable 50 via a first port. A second port of the CTMD 100 is coupled to the MV power line.

Data from a user device traverses the LV power line and is coupled onto the coaxial cable 50 via the ID 7. The data traverses the coaxial cable and is received by the CTMD 100, which may perform processing of the data signal. The CTMD 100 may then transmit the data over the MV power line. The data traverses the MV power line until reaching an upstream device such as a backhaul point. After receiving and processing the data, the backhaul point may transmit the data upstream via its upstream communication link, which may comprise a fiber optic cable, a wireless link, a twisted pair, a DSL link, a coaxial cable, an Ethernet cable, or another link.

Similarly, the power line CTMD 100 receives data from the backhaul point addressed to a user device and may transmit the data downstream to the user device (e.g., by using the frequency band and/or address (if any) of the ID 7 or that corresponds to the user device). The addressed user device may then receive and utilize the data.

In some embodiments, such as those communicating through overhead MV conductors, data signals may couple across the MV conductors. In other words, data signals transmitted on one MV phase conductor may be present on all of the MV phase conductors due to the data coupling between the conductors. As a result, the backhaul point 10 may not need to be physically connected to all three phase conductors of the MV cable and transmission from the backhaul point 10 when coupled to one MV phase conductor will be received by the CTMDs 100 connected to the other MV phase conductors and vice versa. In some embodiments, however, which may include underground MV cables, it may be desirable to couple the backhaul point 10 to all of the available phase conductors.

As will be evident to one skilled in the art from this description, the use of the MV power line as part of the backhaul link may be used in conjunction with any of the other embodiments described herein such as, for example, the embodiment shown and described in relation to FIGS. 4a–b.

The CTM (e.g., coaxial cable) may used to couple together one or more LV subnets and a CTMD 100—all of which receive power from the same MV phase conductor. Alternately, the CTM may be coupled to a one or more IDs 7 (a first ID group) that are coupled to LV subnets receiving power from a first MV phase conductor and a second group of IDs 7 that are coupled to LV subnets that receive power from one or more different MV phase conductors.

Figure 6:
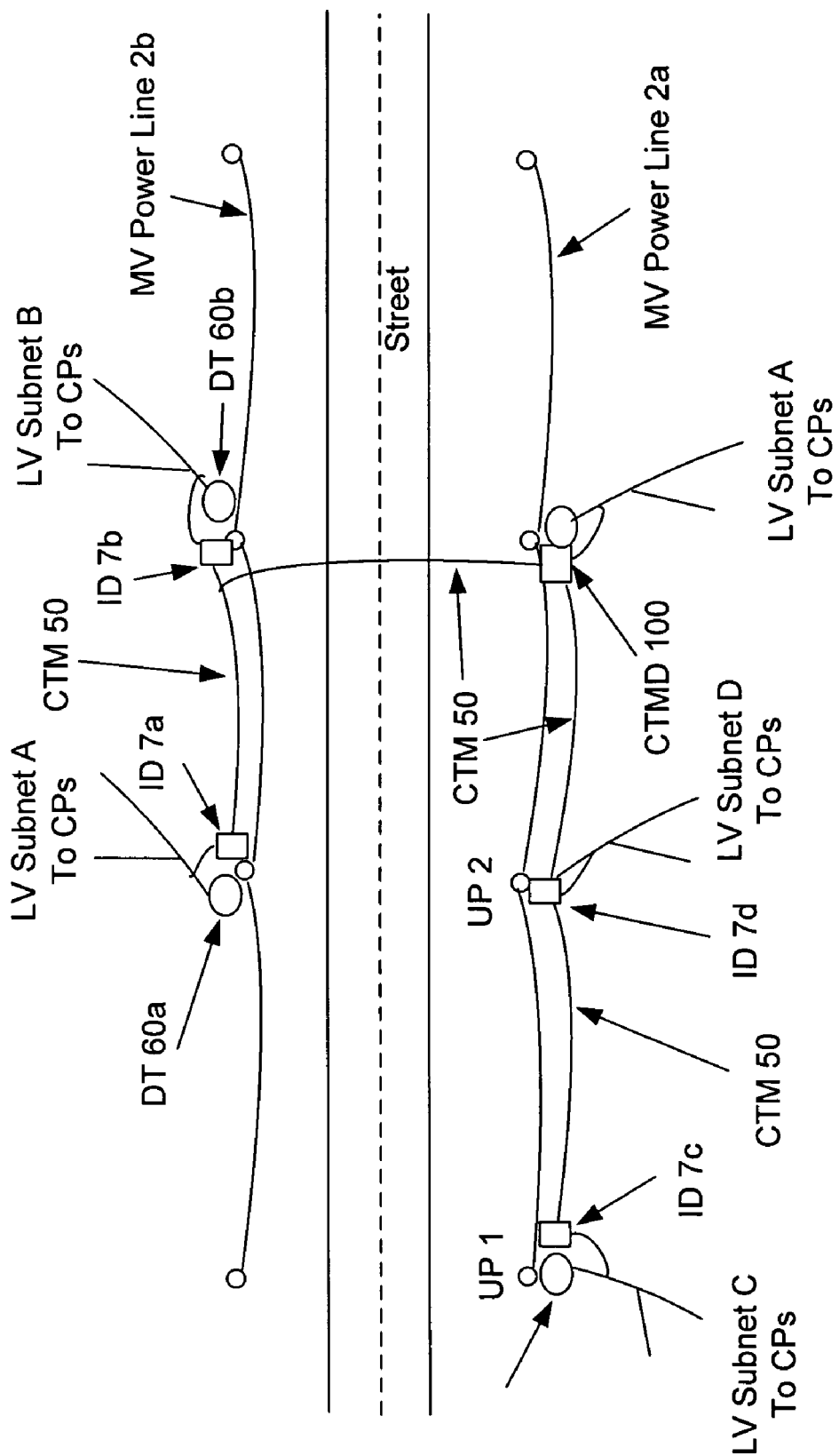
FIG. 6 is a diagram of a power line communications system, in accordance with another example embodiment of the present invention.

As shown in FIG. 6, often a first MV power line 2*a* (e.g., comprised of one to three MV phase conductors) runs parallel to (and along side) a street on a first side of the street and a second MV power line 2*b* may run along the other side of the street. Instead of installing CTMDs 100 on both sides of the street, a CTM 50 may be used to couple the CTMD 100 on one side of the street to one or more IDs 7 (and their respective LV subnets) on the other side of the street. FIG. 6 illustrates two IDs 7*a* and 7*b* that provide communications for LV subnets that receive power from MV power line 2*b*. However, these IDs 7*a* and 7*b* are communicatively coupled to CTMD 100 (via CTM 50), which is also communicatively coupled to IDs 7*c* and 7*d* (via CTM 50) that have LV subnets that receive power from a different MV power line, namely MV power line 2*a*. In addition, CTMD 100 may provide communications to and receive power from LV subnet A, which also receives power from MV power line 2*a* (which is different from MV power line 2*b*).

In another alternate embodiment, the CTMD may communicate with the backhaul point, for example, wirelessly, via a fiber optic cable, a twisted pair, a DSL connection, Ethernet connection, the medium voltage power line (e.g., using surface waves), or other communications medium.

As will be evident to those skilled in the art, the CTMD 100 may be in communication with numerous IDs such as three, five, ten, or more PLCIDs thereby servicing six, twelve, twenty-four, or more customer premises. In the network, there may be numerous CTMDs each providing communications for numerous IDs that each provide communications for numerous user devices in numerous customer premises. The plurality of CTMD may be coupled to one or more backhaul points via the same and/or different communication medium (e.g., coaxial cable or fiber optic cable).

Each CTMD (and IDs if an active device) may be coupled to the LV power line to receive power therefrom and to provide communications to the user devices of the customer premises coupled to those LV power lines. Thus, the CTMD and IDs may be communicatively coupled to one or more of the energized power line conductors of the LV power line as discussed in the incorporated application.

The LV power line is comprised of two energized conductors and neutral conductor. After the two LV energized conductors enter the customer premises, typically only one LV energized conductor will be present at each wall socket where a power line modem might be installed (e.g., plugged in). Given this fact regarding the internal customer premises wiring, there is no way to know to which LV energized conductor the PLID (and user device) will be connected. In addition, the subscriber may move the PLID and user device to another socket to access the PLCS and the new socket may be coupled to the second (different) LV energized conductor. Given these facts, the network designer must supply communications on both LV energized conductors and, therefore, would be motivated to simultaneously transmit the PLC RF data signal on each LV energized conductor referenced to the neutral conductor. However, in comparison to transmitting the RF data signals on both energized conductors referenced to the neutral, the following method of providing communications on the LV energized has been found to provide improved performance.

Figure 7:
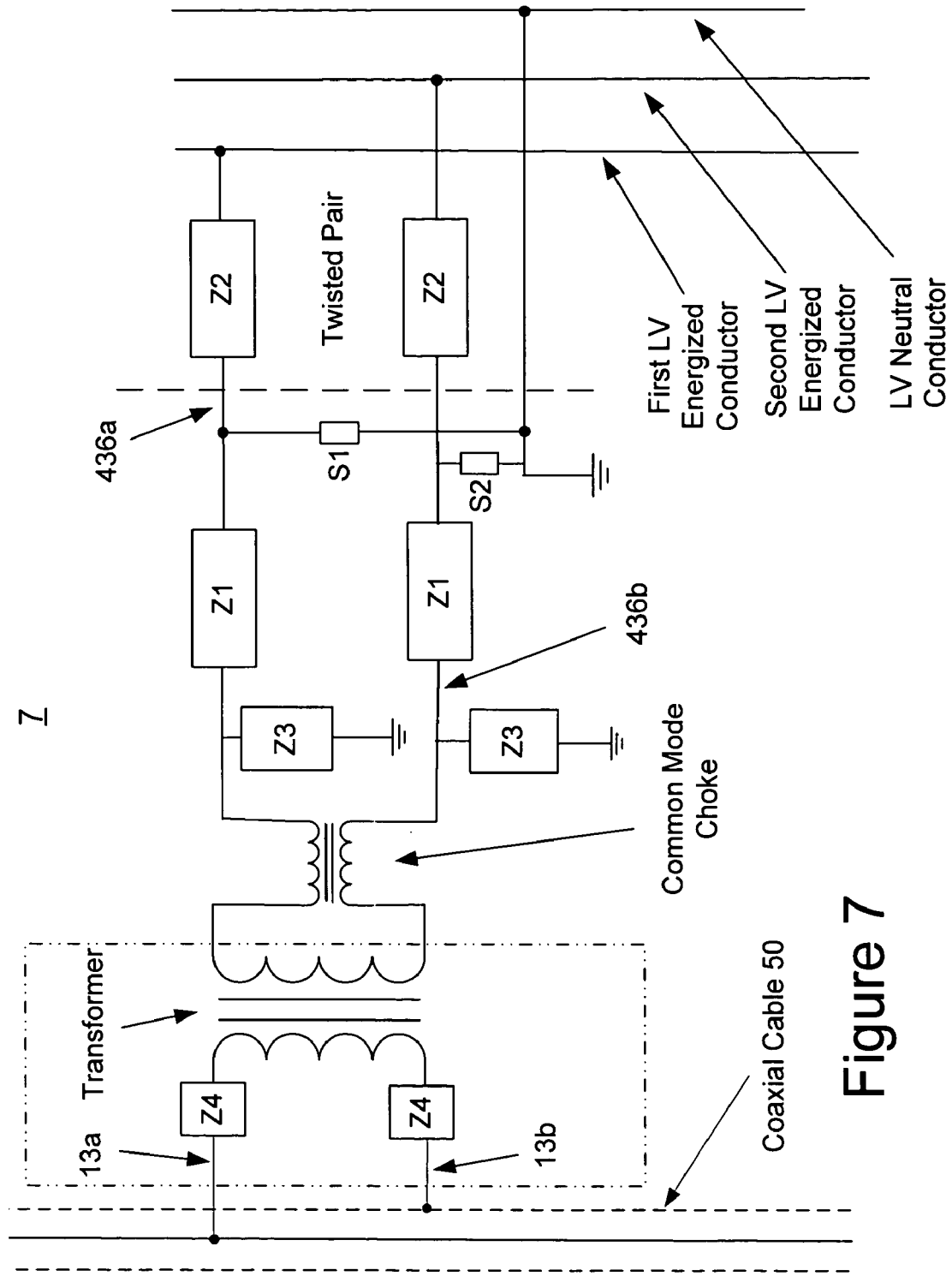
FIG. 7 is a functional block diagram of an example embodiment of a interface device, in accordance with an embodiment of the present invention.

One example of an ID 7 is shown in FIG. 7. In this embodiment, the IDs 7 is a passive device while other embodiments may be active devices (e.g., drawing power from the LV power line. This ID 7 is comprised of an impedance translation circuit and a filter. The circuit of this embodiment is comprised of a transformer having a first winding coupled to a conductor pair 436, which traverse through a common mode choke. The common mode choke provides a very low impedance to differential currents in the two conductors 436*a,b*, but provides a significant or high impedance to common mode currents (i.e., currents traveling in the same direction such as in or out). The two conductors 436*a,b* may also be coupled to ground by an impedance Z3, which may be a resistive impedance. In addition, each conductor 436*a,b* includes a series impedance Z1, which may be a capacitive impedance, or other high pass filter component(s), for impeding the 60 Hz power signal and permitting the RF data signal to pass substantially unimpeded. Such impedances may be on either side of the common mode choke, but are preferably on the LV power line side of the choke.

Additionally, each conductor 436 may include a surge protection circuit, which in FIG. 7 are shown as S1 and S2. Finally, the cable 436 may be comprised of a twisted pair of conductors between the ID enclosure and LV power line. As will be evident to those skilled in the art, the twisted pair cable 436 may have an impedance (determined by the geometry of the cable) as represented by Z2. This impedance Z2 may be modeled by a resistive component and an inductive component. The inductive component also may cause coupling between the two twisted wired conductors.

While not shown in the figures, the circuit of either also may include a fuse in series with each conductor and a voltage limiting device, such as a pair of oppositely disposed zener diodes, coupled between the pair of conductors and may be located between the common mode choke and the transformer. In an alternate embodiment, one of the conductors of the ID cable(s) 436 a or b may used to supply power to the power supply of the ID 7 to power the ID 7 if a power supply were present (e.g., to power an amplifier, modem, processor, and/or other circuitry).

The transformer of FIG. 7, which is a balun and provides impedance matching, also has a second winding that is coupled to the coaxial cable through impedances Z4 and conductors 13*a* and 13*b*. In an alternate embodiment the balun may be designed so that it does not communicate or transfer the power signal but does communicate the data signals and thereby provides high pass filtering.

Both impedances Z4 in this example embodiment are of the same value and are resistive. In other embodiments, each Z4 may be of a different value and include a reactive component (e.g., capacitive or inductive) in order to filter the LV power signal and/or to provide the appropriate impedance matching, or other desirable circuit characteristic. Conductor 13*a* of the ID 10 is coupled to the center conductor of the coaxial cable 50 and conductor 13*b* of the ID 10 is coupled to the concentric shield conductor of the coaxial cable 50.

As a result of the above described low voltage interface circuit, the data signal is applied to the first and second LV energized conductors differentially. In other words, with reference to the neutral conductor, the voltage signal (representing the data) on the second LV energized conductor is equal in magnitude and opposite in polarity of the voltage on the first LV energized conductor. Similarly, the current flow representing the data on the second LV energized conductor will be the opposite of the current flow on the first LV energized conductor in magnitude and direction. It has been found that differentially driving the LV energized conductors as described provides significant performance improvements over methods, which may result from reduced reflections, improved signal propagation, and impedance matching among other things. It is worth noting the transmit circuit of this and the following embodiments may transmit data signals with multiple carriers (e.g., eighty or more) such as with using an Orthogonal Frequency Division Multiplex (OFDM) modulation scheme.

It is worth noting that these embodiments of the present invention drive the first and second LV energized conductors differentially to transmit the data signal (e.g., using OFDM). However, the PLM transmits data signals from the customer premises to the ID 7 by applying the data signal to one conductor (e.g., one energized conductor) referenced to the other conductor such as a ground and/or neutral.

While in this embodiment the two energized conductors are opposite in magnitude, other embodiments may phase shift the data signal on one conductor (relative to the data signal on the other conductor) by forty-five degrees, ninety degrees, one hundred twenty degrees, one hundred eighty degrees, or some other value, in addition to or instead of differentially driving the two conductors.

Other embodiments of the ID 7 may include an amplifier that draws power from the low voltage power line. More specifically, the power signal from the LV power line supplies power to a power supply (e.g., that includes a rectifier and filter circuit) that powers one (for unidirectional) or two (for bi-directional) amplifiers for amplifying of the signal.

In still another embodiment, the ID 7 may further include a regeneration module that comprises a power line modem chip set circuit that communicates data via the LV power line. In addition, the regeneration module comprises a CTM transceiver. The CTM transceiver receives a data input (e.g., an input from the power line modem or a router) and transmits the data via the CTM (e.g., coaxial cable). As will be evident to those skilled in the art, transmission may comprise filtering, modulation, error coding, channel coding, MAC processing, etc.

Thus, the ID 7 may filter, demodulate, decrypt, convert, re-modulate, and encrypt the data received from each medium for transmission onto the other medium. The ID 7 may convert data signals from the power line that are in a first frequency band, and in a first modulation scheme to a different frequency band and different modulation scheme for transmission through the coaxial cable (and vice versa). Thus, the ID 7 may also provide frequency shifting.

In some embodiments the interface device 7 may perform the same functions as those described for the CTMD below. For convenience, some of those functions include Media Access Control (MAC) processing, data filtering, routing, packet prioritizing (e.g., especially for IP telephony voice data), access control, and others. Thus, an ID may comprise a processor, memory, and software programming stored therein for performing those functions.

In another embodiment, in addition to or instead of a balun, the ID may comprise a capacitor (and perhaps a resistor) that permits communication of the data signal but prevents communication of the power signal (e.g., forming a high pass filter).

The example CTMD described herein, provides bi-directional communications and may comprise a CTM interface, a transceiver, a controller, and a power supply. The power cable may simply be connected to a low voltage power line (e.g., an energized and neutral conductor), which supplies power to the power supply that converts the AC signal to a DC signal for powering the components of the CTMD.

Figure 8:
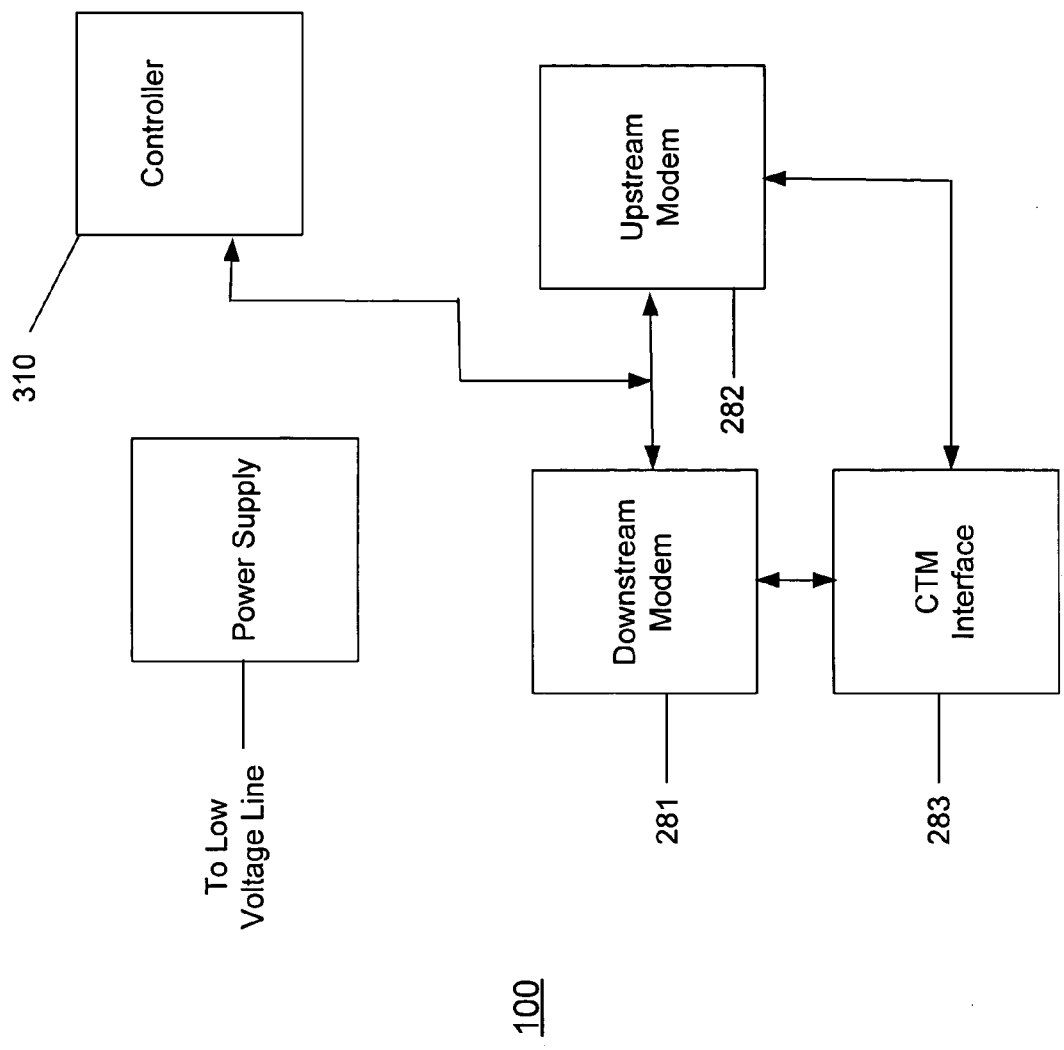
FIG. 8 is a functional block diagram of an example embodiment of a communications device, in accordance with an embodiment of the present invention.

The CTM interface 283 of this example embodiment (shown in FIG. 8) interfaces the CTM to the CTM to provide communication to both the IDs and the upstream device, which in this embodiment is a coaxial cable. As discussed above, this may be accomplished by using a different frequency band for the upstream communications (to the backhaul point) and downstream communications (to the IDs). As shown in FIG. 8, this embodiment may use two modems 281 and 282 (or two modem chip sets) with one providing downstream communications and the other providing upstream communications. Both modems may be identical with the appropriate frequency translation circuitry and filter to provide communications in the appropriate frequency bands. Alternately, a single modem may be used, for example, for a system that employed a single frequency band and time division multiplexed (TDM) communications. The controller 310 may comprise routing functions and software executable to control the operation of the CTMD as will be discussed in more detail below.

The CTM interface may be the same CTM interface as described for the ID 7 and as shown by the dashed rectangle in FIG. 7 and comprising a balun (transformer providing impedance matching), impedances Z4 (e.g. resistors), and conductors 13*a*, 13*b* connected to the winding of the balun. Other embodiments may employ a conventional resistor, capacitor, and/or inductor circuit to provide filtering and impedance matching.

In another embodiment, the CTMD 100 may comprise a second CTM interface for communicating via a second CTM. In still another example embodiment, the CTMD may comprise a CTM interface, a controller, and a MV power line interface. The MV power line interface communicates over the MV power line via an MV power line coupler. The coupling device may be inductive, capacitive, conductive, a combination thereof, or any suitable device for communicating data signals to and/or from the MV power line.

In still another embodiment of a coupler, the coupler includes an inductive coupling device having a toroid with windings that form part of a coupling transformer. In addition, the coupler includes a power coupling device (e.g., a toroid transformer) that supplies electrical energy to a power supply to power the electronics on the MV side of the CTMD.

Another example of such a suitable MV coupler is described in U.S. application Ser. No. 10/348,164, entitled "A Power Line Coupling Device and Method of Using the Same," filed Jan. 21, 2003, which is hereby incorporated by reference. This coupler itself provides isolation by using the isolation provided by a standard underground residential distribution MV cable (although it may be used in an underground or overhead application). Thus, this coupler provides electrical isolation from the MV voltages while communicating signals to and from the MV power line.

Depending on the communication scheme, the CTMD 100 may include the same or different frequency filtering as its associated IDs. For example, if the IDs and CTMD 100 receive data signals in the same frequency band then the filtering may be substantially the same (i.e., TDM). If the IDs and CTMD 100 receive data signals in different frequency bands, then the filtering may be different. In addition, the CTMD 100 may include multiple filters in order to receive data from multiple IDs and the upstream device (e.g., a backhaul point 10). These filters may be communicatively coupled to the same input port and transceiver or may be coupled to a different input port and transceiver. In yet another embodiment, the CTMD 100 may comprise a separate CTM transceiver (and filter) for backhaul point and for each ID (e.g., in an embodiment employing frequency division multiplexing). However, instead of employing multiple transceivers, it may be desirable to use one transceiver and frequency shift the output to the designated frequency band of the targeted destination device.

Likewise, the CTM transceiver receives data from the CTM and may convert the data to a different format by demodulating, error decoding, channel decoding, etc. the data. The CTM transceiver(s) may be any transceiver(s) suitable for communicating according to the desired communication scheme and through the CTM such as, for example, a power line modem, an Ethernet modem, a DSL modem, a cable modem, a satellite modem, an 802.11 transceiver, As discussed, the controller includes the hardware and software for managing communications and control of the CTMD 100. In this embodiment, the controller 310 includes an IDT 32334 RISC microprocessor for running the embedded application software and also includes flash memory for storing the boot code, device data and configuration information (serial number, MAC addresses, subnet mask, and other information), the application software, routing table, and the statistical and measured data. This memory includes the program code stored therein for operating the processor to perform various applications including, for example, routing functions described herein.

This embodiment of the controller also includes random access memory (RAM) for running the application software and temporary storage of data and data packets. This embodiment of the controller also includes an Analog-to-Digital Converter (ADC) for taking various measurements, which may include measuring the temperature inside the CTMD 100 (through a temperature sensor such as a varistor or thermistor), for taking power quality measurements of the LV power line, detecting power outages, detecting power restoration, measuring the outputs of feedback devices, and others. The embodiment also includes a "watchdog" timer for resetting the device should a hardware glitch or software problem prevent proper operation to continue.

As discussed, the controller may comprise a router. The router performs prioritization, filtering, packet routing, access control, and encryption. The router of this example embodiment of the present invention uses a table (e.g., a routing table) and programmed routing rules stored in memory to determine the next destination of a data packet. The table is a collection of information and may include information relating to which interface leads to particular groups of addresses (such as the addresses of the user devices connected to the customer LV power lines), priorities for connections to be used, and rules for handling both routine and special cases of traffic (such as voice packets and/or control packets).

The router will detect routing information, such as the destination address (e.g., the destination IP address) and/or other packet information (such as information identifying the packet as voice data), and match that routing information with rules (e.g., address rules) in the table. The rules may indicate that packets in a particular group of addresses should be transmitted in a specific direction such as through the upstream interface, the downstream interface, or be ignored (e.g., if the address does not correspond to a user device connected to the LV power line or to the CTMD 100 itself).

As an example, the table may include information such as the IP addresses (and potentially the MAC addresses) of the user devices on the CTMD's LV subnets, the MAC addresses of the PLMs on the CTMD's LV subnets, the upstream subnet mask (which may include the MAC address and/or IP address of the CTMD's backhaul point 10), and the IP address of the CTMD's upstream transceiver and downstream transceiver. Based on the destination IP address of the packet (e.g., an IP address), the router may pass the packet to the interface for transmission. Alternately, if the IP destination address of the packet matches an IP address of the CTMD 100, the CTMD 100 may process the packet as a command.

In other instances, such as if the user device is not provisioned and registered, the router may prevent packets from being transmitted from the user to any destination other than a DNS server or registration server. In addition, if the user device is not registered, the router may replace any request for a web page received from that user device with a request for a web page on the registration server (the address of which is stored in the memory of the router).

The router may also prioritize transmission of packets. For example, data packets determined to be voice packets may be given higher priority for transmission through the CTMD 100 than data packets so as to reduce delays and improve the voice connection experienced by the user. Routing and/or prioritization may be based on IP addresses, MAC addresses, subscription level, or a combination thereof (e.g., the MAC address of the PLM or IP address of the user device).

In addition to storing a real-time operating system and routing code, the memory of controller of the CTMD 100 also includes various program code sections such as a software upgrade handler, software upgrade processing software, the PLS command processing software (which receives commands from the PLS, and processes the commands, and may return a status back to the PLS), the ADC control software, the power quality monitoring software, the error detection and alarm processing software, the data filtering software, the traffic monitoring software, the network element provisioning software, and a dynamic host configuration protocol (DHCP) Server for auto-provisioning user devices (e.g., user computers) and associated PLIDs.

A detailed description of such commands and communications with the PLS, auto-provisioning of network components, provisioning of new users and other features implemented in a network element (e.g., a bypass device), backhaul points, and other components and features employed by the present invention are described in U.S. patent application Ser. No. 10/641,689 filed Aug. 14, 2003, entitled "Power Line Communication System and Method of Operating the Same," which is hereby incorporated by reference in its entirety.

As discussed, the CTMD and ID of the above embodiments communicate data to user devices via the LV power line. Rather than communicating data to the PLM and/or user devices via the LV power line, the CTMD and/or ID may use other communications mediums. For example, the CTMD and/or the ID may convert the data signals to a format for communication via a telephone line, fiber optic cable, or coaxial cable. Such communications may be implemented in a similar fashion to the communication via the LV power line as would be well known to those skilled in the art. In this instance, the ID would likely be a powered device and draw power from the LV power line through a power supply to power the transceiver for the communications medium.

In addition, the CTMD and/or ID may convert the data signals to radio signals for communication over a wireless communication link to the user device. In this case, the user devices may be coupled to, or incorporate in, a radio transceiver for communicating through the wireless communications link. The wireless communications link may be a wireless local area network implementing a network protocol in accordance with an IEEE 802.11 (e.g., a, b, or g) standard. Again, in this embodiment, the ID may be a powered device and draw power from the LV power line through a power supply to power the transceivers. Alternately, the ID may simply feed a functionally separate wireless radio transceiver the data signals with the wireless transceiver drawing power from the LV power line through a power supply. Alternately, the coaxial cable (or other CTM) may communicate 802.11 signals and the ID may be comprised of a coaxial cable (or other CTM) interface, and a directional antenna. The ID may also include a power supply, an impedance matching circuit, and an amplifier for amplifying transmitted and/or received data signals (e.g., a first and second amplifier for amplifying data signals in each frequency band that correspond to the upstream and downstream data flow).

Alternately, the CTMD (or ID) may communicate with the user devices via a fiber optic link. In this alternative embodiment, the CTMD (or ID) may convert the data signals to light signals for communication over the fiber optic link. In this embodiment, the customer premises may have a fiber optic cable for carrying data signals, rather than using the internal wiring of customer premise.

Finally, the type of data signal coupled by the coupling device may be any suitable type of data signal. The type of signal modulation used can be any suitable signal modulation used in communications (Code Division Multiple Access (CDMA), Time Division Multiple Access (TDMA), Frequency Division Multiplex (FDM), Orthogonal Frequency Division Multiplex (OFDM), and the like). OFDM may be used any or all of the LV power lines, backhaul link, and CTM. A modulation scheme producing a wideband signal such as CDMA that is relatively flat in the spectral domain may be used to reduce radiated interference to other systems while still delivering high data communication rates.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A power line communications system for providing communications for one or more user devices via one or more low voltage power line subnets, wherein each low voltage power line subnet is electrically connected to a distribution transformer connected to a medium voltage power line, the system comprising:
    a first communications device comprising a first non-power line communications medium interface, and a backhaul link interface configured to communicate via over a non-power line communication medium and in communication with said first non-power line communications medium interface;
    a non-power line wired communications medium extending substantially parallel to the medium voltage power line and wherein said first non-power line communications medium interface is coupled to said non-power line wired communications medium;
    a second communications device comprising a second non-power line communications medium interface communicatively coupled to said non-power line wired communications medium and comprising a first modem, and a first low voltage (LV) power line interface in communications with said second non-power line communications medium interface and comprising a second modem and a first router in communication with said second modem;
    wherein said second communications device is in communication with said first communications device via said non-power line wired communications medium;
    wherein said second communications device is in communication with one or more of the user devices via a first low voltage power line subnet communicatively coupled to said first LV power line interface;
    a third communications device comprising a third non-power line communications medium interface communicatively coupled to said non-power line wired communications medium and comprising a third modem, and a second LV power line interface in communications with said third non-power line communications medium interface and comprising a fourth modem and a second router in communication with said fourth modem;
    wherein said third communications device is in communication with said first communications device via the non-power line wired communications medium; and
    wherein said third communications device is in communication with one or more of the user devices via a second low voltage power line subnet communicatively coupled to said second LV power line interface.

2. The system of claim 1, further comprising a backhaul point comprising a downstream interface and wherein said first communications device is in communication with said backhaul point via a backhaul link communicatively coupled to said backhaul link interface of said first communications device and said downstream interface of said backhaul point.

3. The system of claim 2, wherein said backhaul link comprises a wireless communication link.

4. The system of claim 2, wherein said backhaul link comprises a fiber optic link.

5. The system of claim 2, wherein said backhaul link comprises a coaxial cable.

6. The system of claim 2, wherein the non-power line wired communications medium comprises a coaxial cable.

7. The system of claim 6, wherein said coaxial cable comprising said backhaul link also comprises the non-power line wired communications medium.

8. The system of claim 6, wherein the coaxial cable comprising said backhaul link is coupled to said coaxial cable comprising said non-power line wired communications medium via said first communications device.

9. The system of claim 2, wherein the communications medium comprising said backhaul link is coupled to the non-power line wired communications medium via said first communications device.

10. The system of claim 1, wherein said first communications device further comprises a first transceiver in communication with said first non-power line communications medium interface.

11. The system of claim 10, wherein said first communications device further comprises a second transceiver in communication with said backhaul interface.

12. The system of claim 11, wherein said first communications device further comprises a router in communication with said first transceiver and said second transceiver.

13. The system of claim 1, wherein the second communications device comprises a first high pass filter communicatively coupled to said low voltage interface.

14. The system of claim 1, wherein the non-power line wired communications medium comprises a coaxial cable.

15. A method of providing communications for one or more user devices via one or more low voltage power lines subnets, wherein each low voltage power line subnet is electrically connected to a distribution transformer connected to a medium voltage power line, comprising:
   at a first communication device receiving first data via a first low voltage power line subnet from a first user device and receiving second data via the first low voltage power line subnet from a second user device;
   at the first communication device routing said first data for transmission over a non-power line wired communications medium;
   transmitting said first data over said non-power line wired communications medium from the first communication device;
   at a second communication device, receiving third data via a second low voltage power line subnet from a third user device and receiving fourth data via the second low voltage cower line subnet from a fourth user device;
   at the second communication device routing said third data for transmission over the non-power line wired communications medium;
   transmitting said third data over said non-power line wired communications medium from the second communication device;
   at a third communication device, receiving said transmitted first data and said transmitted third data via said non-power line wired communications medium;
   transmitting the first data over a backhaul link; and
   wherein said non-power line wired communications medium runs substantially parallel to a medium voltage power line.

16. The method of claim 15, further comprising:
   at the first device:
      prioritizing the received first data and the second data;
      transmitting the first data over the non-power line wired communications medium at a higher priority than said second data according to said prioritizing.

17. The method of claim 16, wherein the first data comprises voice data.

18. The method of claim 17, wherein the second data comprises Internet data.

19. The method of claim 16, wherein the first data comprises video data.

20. The method of claim 16, wherein the first data and the second data comprise voice data.

21. The method of claim 15, wherein the backhaul link comprises a wireless communication link.

22. The method of claim 15, wherein the backhaul link comprises a fiber optic link.

23. The method of claim 15, wherein the backhaul link comprises a coaxial cable.

24. The method of claim 15, wherein the non-power line wired communications medium comprises a coaxial cable.

25. The method of claim 15, wherein the non-power line wired communications medium comprises a fiber optic link.

26. The method of claim 15, wherein the backhaul link comprises a medium voltage power line.

27. The method of claim 15, wherein the backhaul link is coupled to the non-power line wired communications medium via the third communications device.

28. The method of claim 15, wherein the backhaul link comprises the non-power line wired communications medium.

29. A power line communications system for providing communications for one or more user devices via one or more low voltage power line subnets, wherein each low voltage power line subnet is electrically connected to a distribution transformer connected to a medium voltage power line, the system comprising:
   a plurality of first communications devices, each comprising a first non-power line communications medium interface having a modem, and a second non-power line communications medium interface in communication with said first non-power line communications medium interface, and a router in communication with said modem;
   a plurality of groups of second communications devices, each second communications device comprising a second non-power line communications medium interface having a second modem, a first low voltage (LV) power line interface in communication with said second non-power line communications medium interface having a third modem and a router in communication with said third modem;
   wherein each said second communications device is in communication with one of said plurality of said first communications devices via a non-power line wired communications medium communicatively coupled to said second non-power line communications medium interface of said second communications device and to said first non-power line communications medium interface of said first communications device, wherein said non-power line wired communications medium extends substantially parallel to the medium voltage power line;
   wherein each said second communications devices is in communication with one or more of the user devices via a first low voltage power line subnet communicatively coupled to said first LV power line interface; and
   wherein each said second communications devices of each group is communicatively coupled to at least one other of said second communications devices in said same group via the non-power line wired communications medium.

30. The system of claim 29, wherein each said second communications device in each group is communicatively isolated from other second communications device in other groups.

31. A power line communications system for providing communications for one or more user devices via one or more low voltage power line subnets, wherein each low voltage power line subnet is electrically connected to a distribution transformer connected to a medium voltage power line, the system comprising:
   a backhaul device;
   a plurality of power line communication devices; and
   a non-power line wired communication medium coupled to said plurality of power line communication devices and said backhaul device, and carrying communications between said plurality of power line communication devices and said backhaul device, wherein said non-power line wired communications medium runs substantially parallel to a medium voltage power line;

the backhaul device comprising a first interface for coupling to a backhaul medium and through which backhaul communications are directed, and a second interface for coupling to the non-power line wired communication medium; and each one of said power line communication devices comprising a router, a first modem communicatively coupled to a low voltage power line subnet which carries communications to and from one or more of said user devices, and a second modem in communication with said router and communicatively coupled to the non-power line wired communication medium.

\* \* \* \* \*

UNITED STATES PATENT AND TRADEMARK OFFICE
CERTIFICATE OF CORRECTION

| | | |
|---|---|---|
| PATENT NO. | : 7,098,773 B2 | Page 1 of 1 |
| APPLICATION NO. | : 10/884685 | |
| DATED | : August 29, 2006 | |
| INVENTOR(S) | : Berkman | |

It is certified that error appears in the above-identified patent and that said Letters Patent is hereby corrected as shown below:

On the title page item (56), page 2, under "U.S. Patent Documents", in column 1, line 8, after 6,496,104" delete "B1" and insert -- B2 --, therefor.

On the title page item (56), page 2, under "Other Publications", in column 2, line 10, delete "Universtiy," and insert -- University, --, therefor.

In column 15, line 12, delete "transceiver," and insert -- transceiver. --, therefor.

In column 19, line 30, in Claim 15, delete "cower" and insert -- power --, therefor.

Signed and Sealed this

Fifth Day of December, 2006

JON W. DUDAS
*Director of the United States Patent and Trademark Office*